(12) United States Patent
Suissa et al.

(10) Patent No.: US 10,081,403 B2
(45) Date of Patent: Sep. 25, 2018

(54) LIFTING MECHANISM USING NEGATIVE STIFFNESS

(71) Applicant: GM GLOBAL TECHNOLOGY OPERATIONS LLC, Detroit, MI (US)

(72) Inventors: Avshalom Suissa, Kiryat Ono (IL); Mario Jodorkovsky, Nesher (IL)

(73) Assignee: GM Global Technology Operations LLC, Detroit, MI (US)

(*) Notice: Subject to any disclaimer, the term of this patent is extended or adjusted under 35 U.S.C. 154(b) by 264 days.

(21) Appl. No.: 15/225,081

(22) Filed: Aug. 1, 2016

(65) Prior Publication Data
US 2018/0029657 A1    Feb. 1, 2018

(51) Int. Cl.
| | |
|---|---|
| B62D 65/18 | (2006.01) |
| F16M 11/04 | (2006.01) |
| F16M 11/18 | (2006.01) |

(52) U.S. Cl.
CPC ........... *B62D 65/18* (2013.01); *F16M 11/046* (2013.01); *F16M 11/18* (2013.01)

(58) Field of Classification Search
CPC ....... B62D 65/18; F16M 11/046; F16M 11/18
See application file for complete search history.

(56) References Cited

U.S. PATENT DOCUMENTS

| | | | | |
|---|---|---|---|---|
| 4,583,752 A | * | 4/1986 | Breitbach | B60G 11/32 280/124.165 |
| 9,102,209 B2 | * | 8/2015 | Giovanardi et al. | B60G 17/0165 |
| 2015/0165852 A1 | | 6/2015 | Suissa | |
| 2015/0165858 A1 | | 6/2015 | Suissa | |
| 2015/0167770 A1 | | 6/2015 | Trangbaek et al. | |
| 2015/0354654 A1 | | 12/2015 | Brand et al. | |
| 2016/0347144 A1 | * | 12/2016 | Suissa | B60G 17/0165 |

* cited by examiner

*Primary Examiner* — Michael A Riegelman
(74) *Attorney, Agent, or Firm* — Quinn IP Law

(57) ABSTRACT

A lifting mechanism includes a load bearing structure, and a carrier. The carrier is configured for supporting a load. The carrier is moveable relative to the load bearing structure in a substantially vertical direction relative to a ground surface, along a vertical axis. A load carrying spring applies a spring force that biases the carrier relative to the load bearing structure in a direction along the vertical axis. A negative stiffness device interconnects the carrier and the load bearing structure. The negative stiffness device applies a device force that biases the carrier relative to the load bearing structure in a direction along the vertical axis. The device force opposes the spring force. The device force includes a magnitude that is substantially equal to the spring force in any of a plurality of different positions of the carrier relative to the load bearing structure along the vertical axis.

20 Claims, 3 Drawing Sheets

LIFTING MECHANISM USING NEGATIVE STIFFNESS

TECHNICAL FIELD

The disclosure generally relates to a lifting mechanism.

BACKGROUND

Lifting mechanisms are often used to lift and/or carry a load. For example, an assembly line may be equipped with multiple lifting mechanisms, with each lifting mechanism designed to lift and carry one article along the assembly line. The article may need to be repositioned vertically relative to a ground various reasons. Accordingly, the lifting mechanism may need to be moved to reposition the load relative to the ground surface. Typically, moving the lifting mechanism to raise and lower the load requires the application of a large force. The large force may be applied by electric motors, hydraulics, pneumatics, etc., all of which require the use of energy. The systems used to move the lifting mechanisms may be complex and expensive. Furthermore, the energy required to move the lifting mechanisms may present a significant manufacturing cost.

SUMMARY

A lifting mechanism is provided. The lifting mechanism includes a load bearing structure, and a carrier. The carrier is configured for supporting a load. The carrier is moveable relative to the load bearing structure in a substantially vertical direction relative to a ground surface, along a vertical axis. A load carrying spring applies a spring force that biases the carrier relative to the load bearing structure in a direction along the vertical axis. A negative stiffness device interconnects the carrier and the load bearing structure. The negative stiffness device applies a device force that biases the carrier relative to the load bearing structure in a direction along the vertical axis. The device force opposes the spring force. The device force includes a magnitude that is substantially equal to the spring force in any of a plurality of different positions of the carrier relative to the load bearing structure along the vertical axis.

Accordingly, the lifting mechanism uses the negative stiffness device in parallel with the load carrying spring to provide an equivalent stiffness that is approximately equal to zero, thus substantially cancelling out the gravity acting on the load. This enables an operator to manually raise and lower the load by lifting upward or pulling downward on the carrier, with very little application of force. As such, heavy loads may be raised and/or lowered to a desired height manually.

The above features and advantages and other features and advantages of the present teachings are readily apparent from the following detailed description of the best modes for carrying out the teachings when taken in connection with the accompanying drawings.

DETAILED DESCRIPTION

Figure 1:
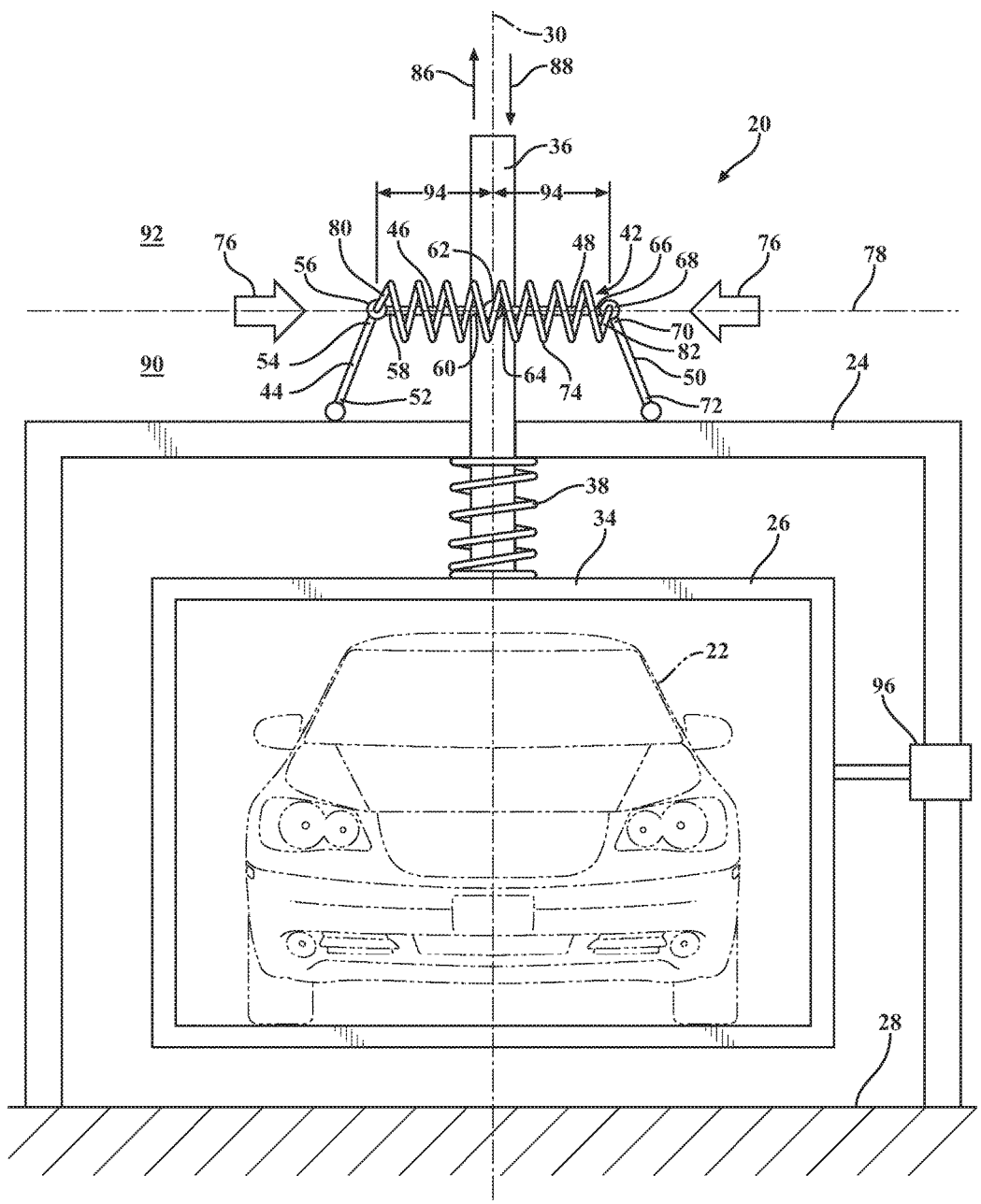
FIG. 1 is a schematic side view of a lifting mechanism in a neutral position.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a lifting mechanism is generally shown at 20. The lifting mechanism 20 is operable to lift and carry a load 22. The load 22 may include most any object for which the lifting mechanism 20 is suitably sized. Accordingly, it should be appreciated that the lifting mechanism 20 may be sized to carry very large and heavy loads 22, such as trucks, cars, boats, atv's, storage containers, shipping containers, etc., or may be sized to carry smaller loads 22, such as engine blocks, transmissions, furniture, appliances, etc. The lifting mechanism 20 may be stationary, or alternatively, may be moveable. For example, the lifting mechanism 20 may be bolted to a floor surface to provide a stationary lifting mechanism, or may be equipped with wheels to provide a moveable lifting mechanism. In other embodiments, an assembly line may be equipped with multiple lifting mechanisms 20 that are moved along an assembly path.

The lifting mechanism 20 includes a load bearing structure 24, and a carrier 26. The load bearing structure 24 may include any rigid structure that is capable of transferring the weight or mass of the load 22 to a support surface, such as a floor or ground surface 28. For example, the load bearing structure 24 may include, but is not limited to, a rigid framework. The load bearing structure 24 may be an independent structure, or may be integrated into and part of a larger structure, such as a building. The load bearing structure 24 may be stationary, or may be configured for movement. The load bearing structure 24 is sized and constructed in a manner suitable to support an intended or maximum load 22, and may be configured and/or constructed accordingly by those skilled in the art, in a manner suitable for an intended purpose.

The carrier 26 is configured to support the load 22, and is coupled to the load bearing structure 24. The carrier 26 is moveable relative to the load bearing structure 24 in a substantially vertical direction relative to the ground surface 28, along a vertical axis 30. The vertical axis 30 extends in a substantially upward or normal direction relative to the ground surface 28, in a direction generally opposite to gravity. The carrier 26 is moveable relative to the load bearing structure 24, along the vertical axis 30, between a minimum height 32 (shown in FIG. 2) relative to the ground surface 28, and a maximum height 33 (shown in FIG. 3) relative to the ground surface 28. Additionally, the carrier 26 is moveable relative to the load bearing structure 24 to an infinite number of positions between the minimum height 32 and the maximum height 33. While the exemplary embodiment shown in the Figures shows the carrier 26 positioned generally beneath the load bearing structure 24, it should be appreciated that the carrier 26 may be positioned in other configurations relative to the load bearing structure 24, such as above the load bearing structure 24.

The carrier 26 may be configured in any manner for the intended purpose of the lifting mechanism 20. Broadly described, the exemplary embodiment shows the carrier 26 having a tray portion 34 and a post portion 36, with the post portion 36 extending upward from the tray portion 34 along the vertical axis 30. It should be appreciated that the tray portion 34 may be sized, shaped, and configured in any suitable manner. While the exemplary embodiment shows the post portion 36 extending upward from the tray portion 34, it should be appreciated that in other embodiments of the lifting mechanism 20, the post portion 36 may extend downward from the tray portion 34.

The lifting mechanism 20 includes a load carrying spring 38 disposed between the load bearing structure 24 and the carrier 26. The load carrying spring 38 applies a spring force 40 that biases the carrier 26 relative to the load bearing structure 24 in a direction along the vertical axis 30. As described in greater detail below, the direction of the spring force 40 of the load carrying spring 38 may be either an upward vertical direction along the vertical axis 30, or a downward vertical direction along the vertical axis 30, depending on the position of the lifting mechanism 20. The load carrying spring 38 may include any spring device capable of being placed in either compression or in tension. For example, the load carrying spring 38 may include a coil spring that is disposed annularly about the post portion 36 of the carrier 26, between the tray portion 34 of the carrier 26 and the load bearing structure 24. However, it should be appreciated that the load carrying spring 38 may be embodied as another type of spring, other than the exemplary coil spring shown and described herein. For example, the load carrying spring 38 may include, but is not limited to, a magnetic spring, a mechanical spring, a pneumatic spring, a hydraulic spring, or a gas spring.

The lifting mechanism 20 includes a negative stiffness device 42, which interconnects the carrier 26 and the load bearing structure 24. The negative stiffness device 42 includes a first link 44, a second link 46, a third link 48, and a fourth link 50. The first link 44 includes a first end 52 that is pivotably connected to the structure, and a second end 54 that is pivotably connected to the second link 46 at a first connection 56. The second link 46 includes a first end 58 that is pivotably connected to the first link 44 at the first connection 56, and a second end 60 that is pivotably connected to the carrier 26 at a central connection 62. The third link 48 includes a first end 64 that is pivotably connected to the carrier 26 at the central connection 62, and a second end 66 that is pivotably connected to the fourth link 50 at a second connection 68. The fourth link 50 includes a first end 70 that is pivotably connected to the third link 48 at the second connection 68, and a second end 72 that is pivotably connected to the structure. The pivotable connections between the various links of the negative stiffness device 42 and/or the carrier 26 may be achieved by any type and/or configuration of connection that allows rotation of two connected elements about a respective axis of rotation. An example of a suitable pivotable connection includes, but is not limited to, a hinged connection. The pivotable connections are configured such that the connected elements rotate about a respective axis that is substantially horizontal relative to the ground surface 28, and generally perpendicular to the vertical axis 30. Furthermore, the respective axis of rotation of all of the pivotable connections of the negative stiffness device 42 are generally parallel with each other.

The negative stiffness device 42 includes a device spring 74. The device spring 74 applies a spring force 76 along a horizontal axis 78. The horizontal axis 78 is substantially perpendicular to the vertical axis 30, and is generally horizontal with the ground surface 28. As such, the horizontal axis 78 is arranged substantially perpendicular to the direction of gravity. The device spring 74 may include any spring device capable of operating in tension to apply a compressive load 22 to the first connection 56 and the second connection 68 respectively. For example, the device spring 74 may include a coil spring. However, it should be appreciated that the device spring 74 may be embodied as some other type and/or configuration of spring not shown or described herein. For example, the device spring 74 may include, but is not limited to, a magnetic spring, a mechanical spring, a pneumatic spring, a hydraulic spring, or a gas spring.

While the load carrying spring 38 and the negative stiffness device 42 are shown and described as being located above the carrier 26, it should be appreciated that the load carrying spring 38 and/or the negative stiffness device 42 may be positioned differently than shown in the exemplary embodiment of the Figures. For example, the lifting mechanism may be embodied as a cart, with the load carrying spring 38 and/or the negative stiffness device 42 located underneath the carrier 26, with the carrier disposed vertically above the load bearing structure 24.

As shown in the exemplary embodiment, the device spring 74 includes a first spring end 80 attached to the linkage system at the first connection 56, and a second spring end 82 attached to the linkage system at the second connection 68. The horizontal axis 78 extends through the first spring end 80 of the device spring 74 and the second spring end 82 of the device spring 74. Therefore, the horizontal axis 78 also extends through the first connection 56 and the second connection 68. The device spring 74 is consistently disposed in tension in order to bias the first connection 56 and the second connection 68 toward each other, along the horizontal axis 78.

The negative stiffness device 42 applies a device force 84 (shown in FIGS. 2 and 3) that biases the carrier 26 relative to the load bearing structure 24 in a direction along the vertical axis 30. The device force 84 is generally applied to the carrier 26 at the central connection 62. The direction of the device force 84 may be either an upward vertical direction along the vertical axis 30, or a downward vertical direction along the vertical axis 30, depending on the position of the lifting mechanism 20. The device force 84 from the negative stiffness device 42 opposes the spring force 40 form the load carrying spring 38.

Referring to FIG. 1, the lifting mechanism 20 is shown in a neutral position. When in the neutral position, the load carrying spring 38 is unstressed, and is in neither tension nor compression. When the load carrying spring 38 is relaxed so that the load carrying spring 38 is not in tension or in compression, the spring force 40 from the load carrying spring 38 is substantially equal to zero. When the load carrying spring 38 is relaxed so that the load carrying spring 38 is not in tension or in compression, the first connection 56, the second link 46, the central connection 62, the third link 48, and the second connection 68 are all aligned along the horizontal axis 78. When in the neutral position, because the spring force 76 from the device spring 74 acts along the longitudinal axis, the central connection 62 is not deflected from the longitudinal axis, and no moment is generated by the negative stiffness device 42. Because no moment is generated when in the neutral position, the device force 84 is substantially equal to zero. This corresponds to the load carrying spring 38 being in the unstressed position, in which the load carrying spring 38 is not in tension or compression, and therefore provides the spring force 40 that is substantially equal to zero.

It should be appreciated that any movement along the vertical axis 30 from the neutral position will place the load carrying spring 38 in either tension or compression, which generates the spring force 40 in the load carrying spring 38 along the vertical axis 30. Additionally, any movement along the vertical axis 30 from the neutral position moves the central connection 62 of the negative stiffness device 42 out of alignment with the horizontal axis 78, i.e., deflects the central connection 62, such that the negative stiffness device 42 generates the device force 84 acting along the vertical axis 30 in opposition to the spring force 40 from the load carrying spring 38.

Figure 2:
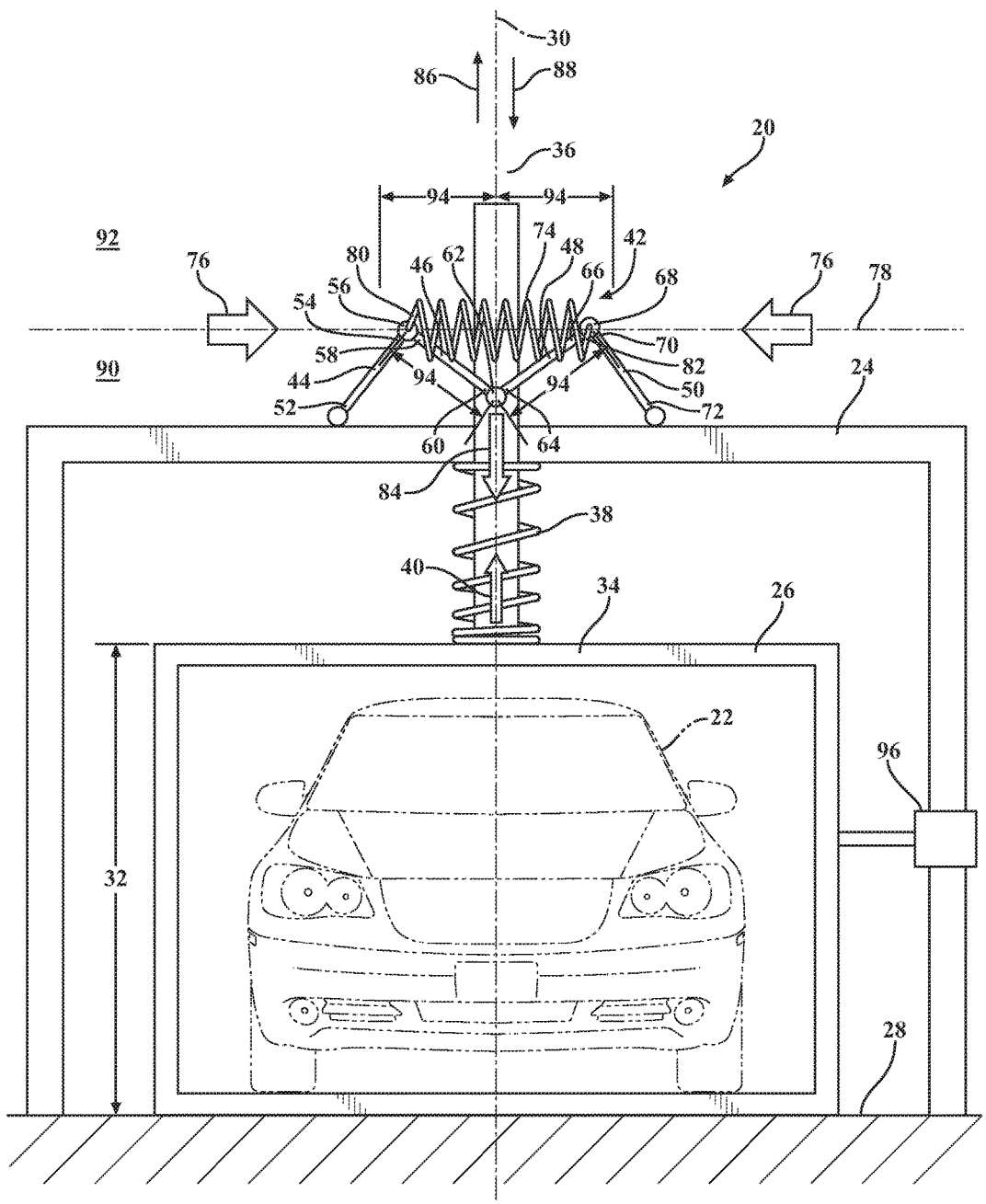
FIG. 2 is a schematic side view of the lifting mechanism in a lowered position.

Referring to FIG. 2, the carrier 26 is shown lowered relative to the load bearing structure 24, such that the load carrying spring 38 is placed in tension. When the load carrying spring 38 is in tension, the spring force 40 from the load carrying spring 38, as applied to the carrier 26, is directed in a first axial direction 86 along the vertical axis 30. The first axial direction 86 is an upward direction along the vertical axis 30 away from the ground surface 28. Movement of the carrier 26 downward relative to the load bearing structure 24 moves the central connection 62 of the negative stiffness device 42 downward, below the horizontal axis 78. As such, when the load carrying spring 38 is in tension, the device spring 74 biases the first connection 56 and the second connection 68 together, which biases the central connection 62 downward along the vertical axis 30, in a second axial direction 88. The second axial direction 88 is a downward direction along the vertical axis 30 toward the ground surface 28. Biasing the central connection 62 downward, in the second axial direction 88, directs the device force 84 in the second axial direction 88, in opposition to the spring force 40 of the load carrying spring 38. Accordingly, it should be appreciated that the device force 84 includes a magnitude that is substantially equal to the spring force 40 of the load carrying spring 38 in any of the possible positions of the carrier 26 relative to the load bearing structure 24 along the vertical axis 30.

Figure 3:
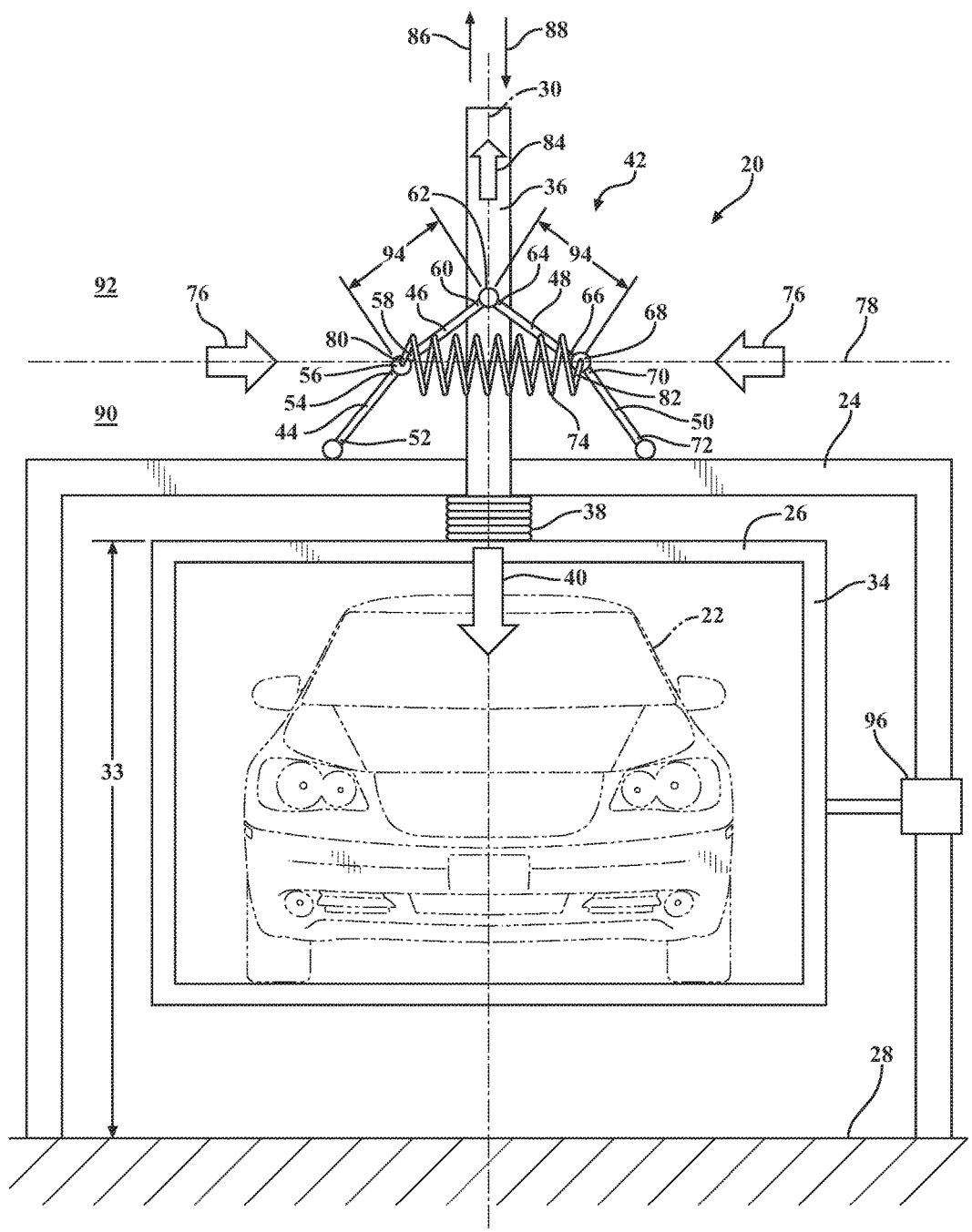
FIG. 3 is a schematic side view of the lifting mechanism in a raised position.

Referring to FIG. 3, the carrier 26 is shown raised relative to the load bearing structure 24, such that the load carrying spring 38 is placed in compression. When the load carrying spring 38 is in compression, the spring force 40 from the load carrying spring 38, as applied to the carrier 26, is directed in the second axial direction 88 along the vertical axis 30. Movement of the carrier 26 upward relative to the load bearing structure 24 moves the central connection 62 of the negative stiffness device 42 upward, above the horizontal axis 78. As such, when the load carrying spring 38 is in compression, the device spring 74 biases the first connection 56 and the second connection 68 together, which biases the central connection 62 upward along the vertical axis 30, in the first axial direction 86. Biasing the central connection 62 upward, in the first axial direction 86, directs the device force 84 in the first axial direction 86, in opposition to the spring force 40 of the load carrying spring 38. Accordingly, it should be appreciated that the device force 84 includes a magnitude that is substantially equal to the spring force 40 of the load carrying spring 38 in any of the possible positions of the carrier 26 relative to the load bearing structure 24 along the vertical axis 30.

As shown in FIG. 2, the central connection 62 is positioned on a first side 90 of the horizontal axis 78 when the load carrying spring 38 is in tension. As shown in FIG. 3, the central connection 62 is positioned on a second side 92 of the horizontal axis 78 when the load carrying spring 38 is in compression. When the central connection 62 moves across the horizontal axis 78, between the first side 90 of the horizontal axis 78 and the second side 92 of the horizontal axis 78, the negative stiffness device 42 goes over-center, and the device force 84 changes between the first axial direction 86 along the vertical axis 30 and the second axial direction 88 along the vertical axis 30.

The lifting mechanism 20 provides an overall spring constant K that is substantially equal to zero, thereby substantially eliminating the effects of gravity. The overall spring constant K is a numeral difference between a spring constant $K_S$ of the load carrying spring 38 and a stiffness constant $K_N$ of the negative stiffness device 42. The overall spring constant may be calculated from Equation 1 below.

$$K = K_S - K_N \qquad 1)$$

As noted above, $K_S$ is the spring constant of the load carrying spring 38. $K_N$ is the stiffness constant of the negative stiffness device 42, and may be calculated from Equation 2 below.

$$K_N = \frac{F_N}{\delta} = \frac{2P}{l} \qquad 2)$$

Referring to Equation 2, $F_N$ is the device force 84 exerted by the negative stiffness device 42 along the vertical axis 30, $\delta$ is the deflection of the central connection 62 relative to the horizontal axis 78 in response to the spring force 76 from the device spring 74 of the negative stiffness device 42, P is the spring force 76 provided by the device spring 74 of the negative stiffness device 42 that is exerted on the second link 46 and the third link 48 at the first connection 56 and the second connection 68 respectively, and/is the length 94 of each of the second link 46 and the third link 48, between the first connection 56 and the central connection 62, and between the second connection 68 and the central connection 62 respectively.

The stiffness constant $K_N$ indicates a negative spring constant associated with the negative stiffness device 42. The stiffness constant $K_N$ is tunable, with the stiffness constant $K_N$ determined in relation to the pre-loaded spring force 76 from the device spring 74, and the length 94 of the second link 46 and the third link 48. The stiffness constant $K_N$ can be tuned to a preferred negative stiffness by varying the length 94 of each of the second link 46 and the third link 48, by changing the pre-loading of the spring force 76 of the device spring 74 that is exerted on the first connection 56 and the second connection 68 along the horizontal axis 78, or by adjusting a spring constant of the device spring 74. Furthermore, the load carrying spring 38 and/or the device spring 74 may be equipped with a trimming mechanism that is operable to adjust the spring constant $K_S$ of the load carrying spring 38, and/or the stiffness constant $K_N$ of the negative stiffness device 42 to accommodate different loads 22.

The lifting mechanism 20 is configured so that the stiffness constant $K_N$ of the negative stiffness device 42 partially or completely cancels the spring constant $K_S$ of the load carrying spring 38 under static loading conditions. This configuration permits a passive suspension system that is capable of supporting large static load 22s, while enabling the overall spring constant K to approach zero under static conditions. By so doing, the carrier 26 may be raised or lowered manually with only a minor application of force. The force required to raise and/or lower the carrier 26 relative to the load bearing structure 24 may be as minimal as the force required to overcome friction between the various components of the lifting mechanism 20.

The lifting mechanism 20 may be equipped with a brake, latch, or other similar clamping device 96 that is operable to secure the position of the carrier 26 relative to the load bearing structure 24. Accordingly, once the position of the carrier 26 is manually adjusted by an operator, the operator may engage the clamping device 96 to secure the position of the carrier 26 relative to the load bearing structure 24. The clamping device 96 may include any device or mechanism capable of securing the carrier 26 relative to the load bearing structure 24. The lifting mechanism 20 may further be equipped with movement limiting features, such as stops or other characteristics the limit the range of motion of the carrier 26 relative to the load bearing structure 24. For example, the movement limiting features may include an upper stop and/or a lower stop to prevent movement beyond the maximum height 33 and/or minimum height 32 respectively. The movement limiting features may be incorporated into the clamping device 96, or may be separate from the clamping device 96. Many such devices are known to those skilled in the art. As such, a specific description of an exemplary embodiment of the clamping device 96, as well as the movement limiting features are not provided herein.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A lifting mechanism comprising:
    a load bearing structure;
    a carrier configured for supporting a load, and moveable relative to the load bearing structure in a substantially vertical direction relative to a ground surface, along a vertical axis;
    a load carrying spring applying a spring force that biases the carrier relative to the load bearing structure in a direction along the vertical axis;
    a negative stiffness device interconnecting the carrier and the load bearing structure, wherein the negative stiffness device applies a device force that biases the carrier relative to the load bearing structure in a direction along the vertical axis;
    wherein the device force opposes the spring force; and
    wherein the device force has a magnitude that is substantially equal to the spring force in any of a plurality of different positions of the carrier relative to the load bearing structure along the vertical axis.

2. The lifting mechanism set forth in claim 1, wherein the load carrying spring is disposed between the load bearing structure and the carrier.

3. The lifting mechanism set forth in claim 2, wherein the spring force of the load carrying spring is directed in a first axial direction along the vertical axis when the load carrying spring is in tension, and the device force of the negative stiffness device is directed in a second axial direction along the vertical axis when the load carrying spring is in tension, wherein the second axial direction is opposite the first axial direction.

4. The lifting mechanism set forth in claim 2, wherein the spring force of the load carrying spring is directed in a second axial direction along the vertical axis when the load carrying spring is in compression, and the device force of the negative stiffness device is directed in a first axial direction along the vertical axis when the load carrying spring is in compression, wherein the second axial direction is opposite the first axial direction.

5. The lifting mechanism set forth in claim 1, wherein the carrier includes a tray portion and a post portion extending from the tray portion along the vertical axis.

6. The lifting mechanism set forth in claim 5, wherein the load carrying spring is disposed annularly about the post portion of the carrier, between the tray portion of the carrier and the load bearing structure.

7. The lifting mechanism set forth in claim 1, wherein the negative stiffness device includes a device spring applying a spring force along a horizontal axis, and wherein the horizontal axis is substantially perpendicular to the vertical axis.

8. The lifting mechanism set forth in claim 7, wherein the load carrying spring is one of a coil spring, a mechanical spring, a pneumatic spring, a hydraulic spring, or a gas spring, and wherein the device spring is one of a coil spring, a mechanical spring, a pneumatic spring, a hydraulic spring, or a gas spring.

9. The lifting mechanism set forth in claim 7, wherein the negative stiffness device includes a first link, a second link, a third link, and a fourth link, and wherein:
    the first link includes a first end pivotably connected to the structure, and a second end pivotably connected to the second link at a first connection;
    the second link includes a first end pivotably connected to the first link at the first connection, and a second end pivotably connected to the carrier at a central connection;
    the third link includes a first end pivotably connected to the carrier at the central connection, and a second end pivotably connected to the fourth link at a second connection; and
    the fourth link includes a first end pivotably connected to the third link at the second connection, and a second end pivotably connected to the structure.

10. The lifting mechanism set forth in claim 9, wherein the device spring includes a first spring end attached to the first connection, and a second spring end attached to the second connection, with the horizontal axis extending through the first connection and the second connection.

11. The lifting mechanism set forth in claim 10, wherein the device spring biases the first connection and the second connection toward each other, along the horizontal axis.

12. The lifting mechanism set forth in claim 10, wherein the central connection is positioned on a first side of the horizontal axis when the load carrying spring is in tension, and wherein the central connection is positioned on a second side of the horizontal axis when the load carrying spring is in compression.

13. The lifting mechanism set forth in claim 12, wherein the device force changes between a first axial direction along the vertical axis and a second axial direction along the vertical axis, when the central connection moves across the horizontal axis, between the first side of the horizontal axis and the second side of the horizontal axis.

14. The lifting mechanism set forth in claim 1, wherein the carrier is moveable relative to the load bearing structure, along the vertical axis, between an infinite number of positions between a minimum height and a maximum height.

15. A lifting mechanism comprising:
    a load bearing structure;
    a carrier having a tray portion for supporting a load, and a post portion extending from the tray portion along a vertical axis, wherein the carrier is moveable relative to the load bearing structure along the vertical axis;

a load carrying spring disposed between the tray portion and the load bearing structure, and applying a spring force that biases the carrier relative to the load bearing structure in a direction along the vertical axis;

a negative stiffness device interconnecting the carrier and the load bearing structure, and including a device spring applying a spring force along a horizontal axis, which is substantially perpendicular to the vertical axis;

wherein the spring force of the device spring generates a device force that biases the carrier relative to the load bearing structure in a direction along the vertical axis;

wherein the device force opposes the spring force;

wherein the device force has a magnitude that is substantially equal to the spring force in any of a plurality of different positions of the carrier relative to the load bearing structure along the vertical axis;

wherein the spring force of the load carrying spring is directed in a first axial direction along the vertical axis when the load carrying spring is in tension, and the device force of the negative stiffness device is directed in a second axial direction along the vertical axis when the load carrying spring is in tension;

wherein the spring force of the load carrying spring is directed in the second axial direction along the vertical axis when the load carrying spring is in compression, and the device force of the negative stiffness device is directed in the first axial direction along the vertical axis when the load carrying spring is in compression; and wherein the second axial direction is opposite the first axial direction.

16. The lifting mechanism set forth in claim 15, wherein the negative stiffness device includes a first link, a second link, a third link, and a fourth link, and wherein:

the first link includes a first end pivotably connected to the structure, and a second end pivotably connected to the second link at a first connection;

the second link includes a first end pivotably connected to the first link at the first connection, and a second end pivotably connected to the carrier at a central connection;

the third link includes a first end pivotably connected to the carrier at the central connection, and a second end pivotably connected to the fourth link at a second connection; and the fourth link includes a first end pivotably connected to the third link at the second connection, and a second end pivotably connected to the structure.

17. The lifting mechanism set forth in claim 16, wherein the device spring includes a first spring end attached to the first connection, and a second spring end attached to the second connection, with the horizontal axis extending through the first connection and the second connection.

18. The lifting mechanism set forth in claim 17, wherein the device spring biases the first connection and the second connection toward each other, along the horizontal axis.

19. The lifting mechanism set forth in claim 16, wherein the central connection is positioned on a first side of the horizontal axis when the load carrying spring is in tension, and wherein the central connection is positioned on a second side of the horizontal axis when the load carrying spring is in compression.

20. The lifting mechanism set forth in claim 19, wherein the device force changes between the first axial direction along the vertical axis and the second axial direction along the vertical axis, when the central connection moves across the horizontal axis, between the first side of the horizontal axis and the second side of the horizontal axis.

\* \* \* \* \*